Jan. 12, 1971　　　　　R. B. MISKIN　　　　3,554,601
TRUCK BED HOIST WITH FOLDING LINKAGE
Filed Sept. 10, 1968　　　　　　　　　　3 Sheets-Sheet 3
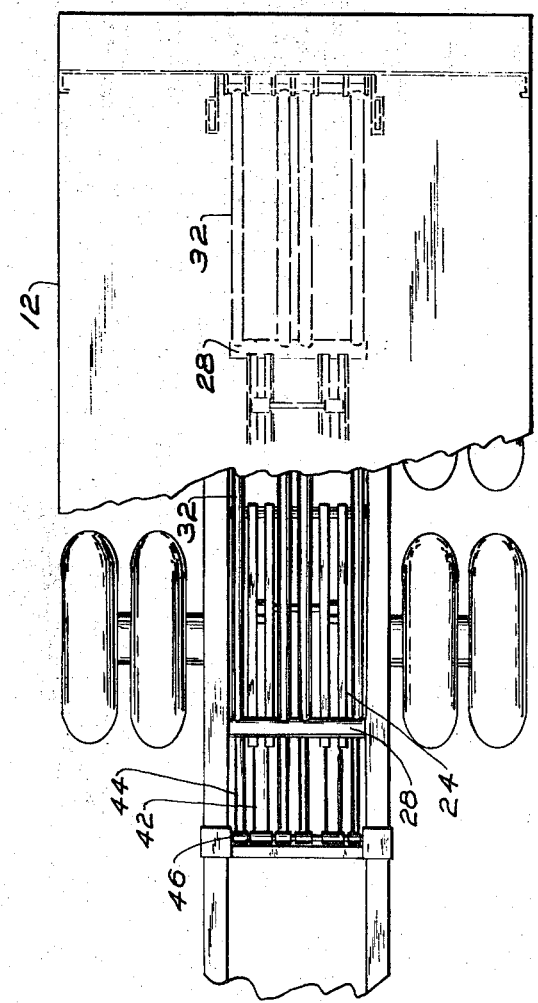
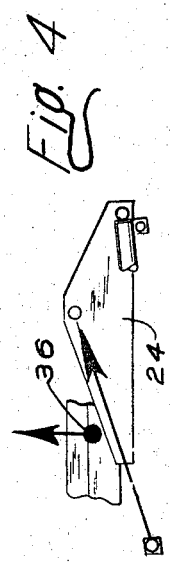
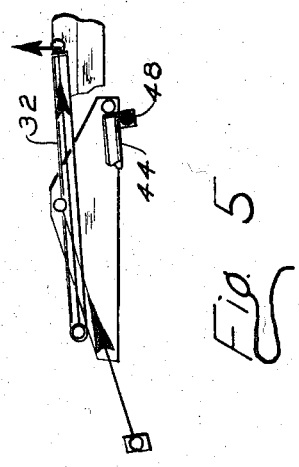
INVENTOR:
Richard B. Miskin
BY

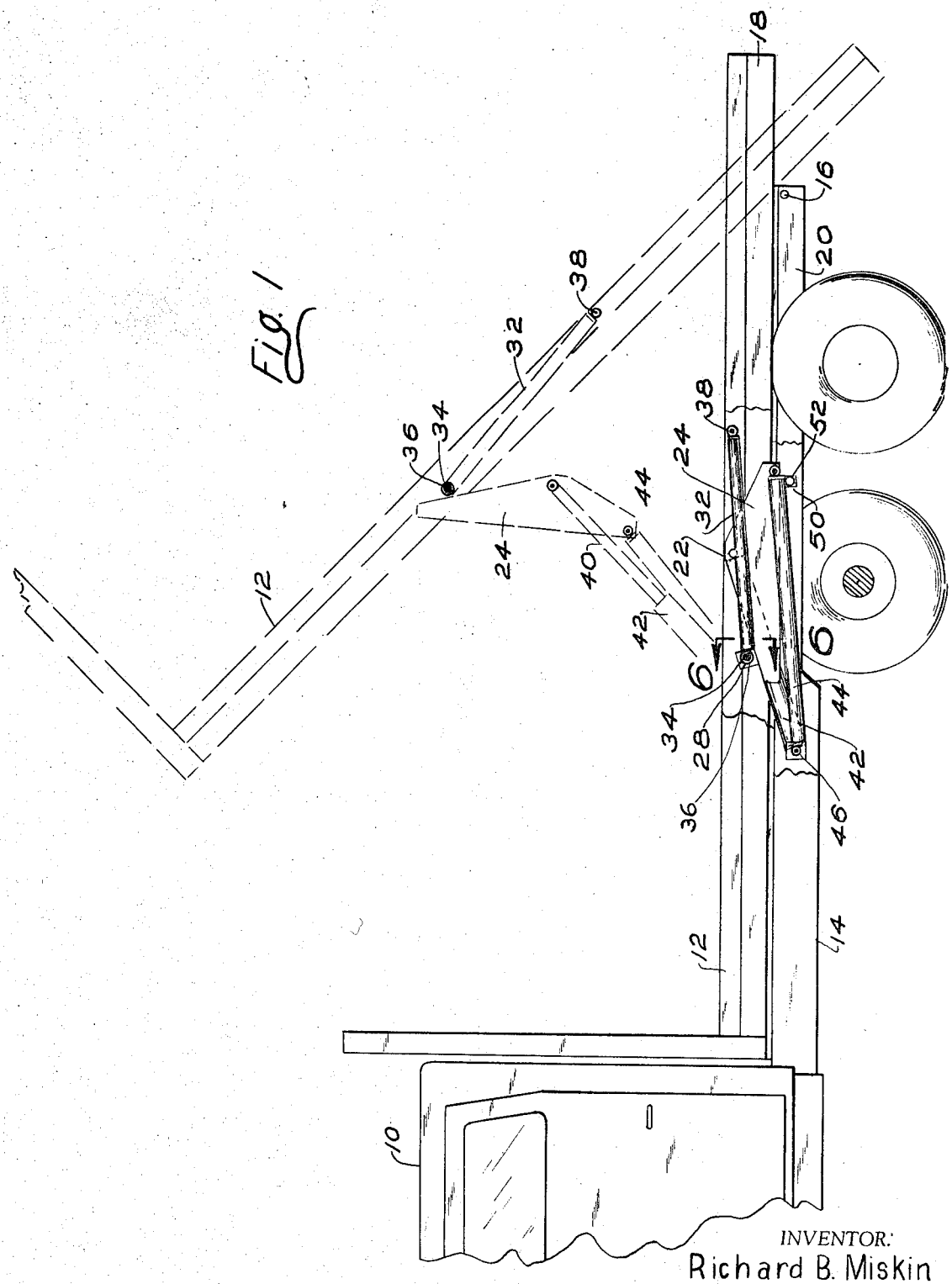

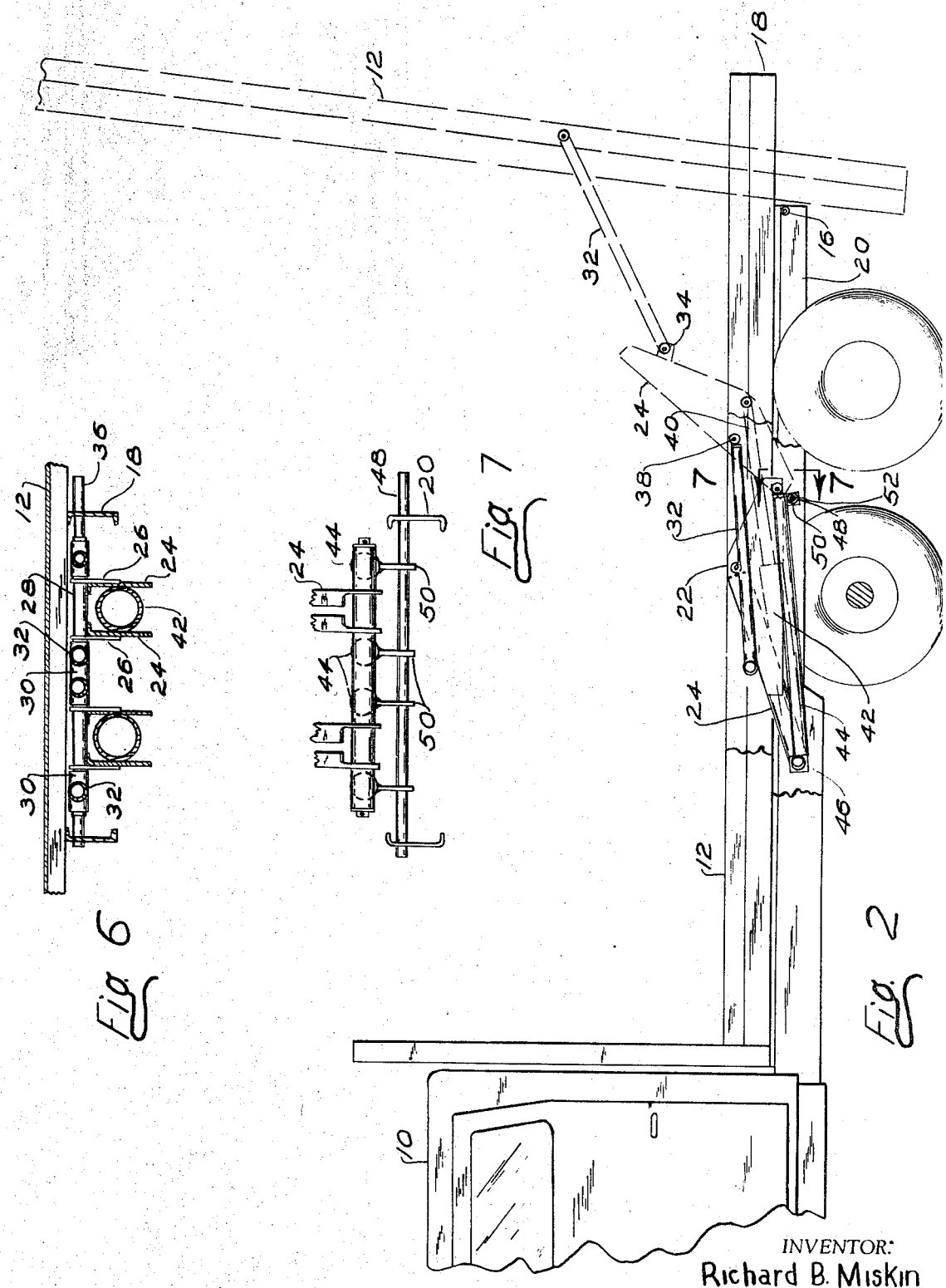

United States Patent Office 3,554,601
Patented Jan. 12, 1971

3,554,601
TRUCK BED HOIST WITH FOLDING LINKAGE
Richard B. Miskin, Ucon, Idaho 83454
Filed Sept. 10, 1968, Ser. No. 758,888
Int. Cl. B60p 1/20
U.S. Cl. 298—22                                    7 Claims

ABSTRACT OF THE DISCLOSURE

A truck bed hoist apparatus with folding linkage means including hydraulic ram means operatively connected to truss means with the truss means being operatively connected to holding bar means and push rod means with the holding bar means operatively connected to a truck chassis and the ram means also connected to the truck chassis with the truck bed hoist means providing a folding linkage when not in use, and with the truck bed hoist means provided with means to selectively connect it to different portions of the truck bed and chassis, so as to permit the hoist to be used for raising heavy loads and raising light loads.

---

The present invention relates to a truck bed hoist apparatus and more particularly to a truck bed hoist apparatus that is used with vehicles such as trucks and the like.

It is an object of the present invention to provide a compact and sturdy and efficient truck bed hoist apparatus that has a folding linkage, which is completely folded when not in use and when the truck bed with which it is used is in a substantially horiontal position.

It is another object of the present invention to provide a truck bed hoist with a folding linkage that can be used to tip the deck of the truck to past a substantially vertical position for unloading lighter loads, such as bales of hay and the like, and which linkage can also be used to discharge a heavy load from the truck platform, such as grain and like substances, by connecting the linkage to the truck at a different location.

It is yet another object of the present invention to provide a folding linkage for use with a truck bed hoist in which the folding linkage can be pivotally connected at one time to one portion of the truck so as to cause a push rod member to become a part of the truck deck and to perform no function at one time, to dump a heavy load from the truck, and to provide means for connecting the linkage to another part of the truck at another time so that the holding bar member of the linkage is connected to the chassis of the truck and the push rod member becomes an active part of the linkage and permits the truck to discharge light loads therefrom, such as bales of hay and the like.

Another object of the present invention is to provide a folding linkage utilized with a truck bed hoist having selectively connected pivot means for securing the linkage to the truck at different locations, so that the same linkage can be utilized to provide two separate functions to change the capacity of the hoisting mechanism and also to change the tilt of the deck or the truck bed when it is in an unloading position.

Various other objects and advantages of the present invention will be readily apparent from the following detailed description when considered in connection with the accompanying drawings forming a part thereof, and in which:

FIG. 1 is a side view of the truck hoist and folding linkage embodying the present invention, illustrating the linkage selectively connected to the truck to lift a heavy load, and with the lift position illustrated in dotted lines;

FIG. 2 is a side view of the truck hoist and the folding linkage embodying the present invention, illustrating the linkage selectively connected to the truck to lift a light load, and to swing the truck bed to a position past the vertical, as illustrated in dotted lines therein;

FIG. 3 is a fragmentary top plan view with portions broken away to illustrate the linkage and with the dotted lines therein showing the deck in a position for unloading material therefrom, when the deck is in the dotted line position illustrated in FIG. 2;

FIG. 4 is a view illustrating the direction of the forces in more or less diagrammatic fashion, when the linkage is connected as shown in FIG. 1;

FIG. 5 is a more or less diagrammatic illustration showing the forces in the linkage when the linkage is connected in the position shown in FIG. 2;

FIG. 6 is a section taken along the lines 6—6 of FIG. 1; and

FIG. 7 is a section taken along the lines 7—7 of FIG. 2.

Referring to the drawings, the reference numeral 10 generally designates a vehicle such as a truck. The truck is provided with a conventional load carrying deck or platform 12 of flat configuration which rests on a chassis 14 and is disposed to pivot about a point 16 adjacent the rear of the chassis 14. The deck 12 is provided with a plurality of longitudinally extending channel members or beams 18, while the chassis is provided with a plurality of longitudinally extending channels or beams 20. The connection of the deck 12 to the chassis 14 at the pivot point 16 so as to pivot thereabout is well known in the art and any suitable means may be used. The truck bed 12 is provided with a folding linkage generally designated 22 for pivoting the truck bed 12 about the point 16 so as to discharge a load of material therefrom.

The linkage 22 is provided with a plurality of truss links, as best seen in FIGS. 1 and 6, which truss links 24 are of triangular configuration and extend in a vertical direction. Referring to FIG. 6, it will be seen that the truss links are welded to brackets 26, which brackets 26 in turn are welded to a transversely extending pipe 28. The pipe or tubular member 28 is disposed adjacent the forward portion of the truss links, as best seen in FIG. 1. The pipe member 28 is provided with bearing sleeves 30, as best seen in FIG. 6, in which the pipe pivots. The bearing sleeves 30 are welded to the front ends of push rods 32 and are adapted to pivot about the pipe 28 or the pivot point 34, as shown in FIG. 1. The pivot pipe 28 is adapted to have a transverse pivot pin 36, best seen in FIG. 6, inserted therethrough and through apertures or openings in the longitudinal beams 18 of the deck 12.

The rear end of the push rods 32 are pivotally connected at 38 to the deck 12. When the pivot pin 36 is inserted through the beams 18, the push rods 32 are anchored to the deck and become motionless and serve no function as a link member, as best seen in FIG. 1, in the raised dotted position of the deck 12.

The truss links 24 have connected to the midportion thereof the piston rods 40 of hydraulic rams 42. The front end of the hydraulic rams 42 are pivotally connected to the chassis beams 20, by any well known means.

The linkage 22 is provided with holding bars 44 which have their forward ends pivotally connected to the chassis by any well known means at the point indicated at 46, and at the same point as the front end of the rams 42. The rear ends of the holding bars 44 are adapted to be selectively connected to the chassis, so as to pivot about a pivot pin 48, and as best seen in FIG. 7. The holding bars 44 are provided with lugs or ears 50 having openings to permit the pivot pin 48 to extend therethrough and the beams 20 of the chassis are further provided with openings to receive the pin 48 therethrough. When the pivot pin 48 is inserted through the ears and the beams 20, the push rod 44, as best illustrated in FIG. 2, does not function as part of the linkage as it is maintained in a motionless state by the pivot pin 48. This selective connection of the holding bars 44 to the chassis is utilized when a light load is to be discharged from the deck 12. The extension of the linkage 22 in this arrangement is best seen illustrated in FIG. 2 in dotted lines therein.

When it is desired to discharge a heavy load such as grain and the like from the deck 12 of the vehicle, the operation of the linkage and the truck hoist is illustrated for such an arrangement in FIG. 1. At this time, the pivot pin 48 is removed from the rear end of the holding bars 44 so that at the point indicated at 52 in FIG. 1, the truss links 24 and the bars 44 are free to move.

At this time, the pivot pin 36 is not removed from the pivot point indicated at 34 in FIG. 1 so that the hydraulic rams 42 and the piston 40 will be extended when the hydraulic system is actuated. At this time, the piston rod 40 pushes the truss links 24 upwardly and into the position illustrated in dotted lines in FIG. 1. At this time, the push rods 32 are linked to the deck 12 and are maintained motionless and the deck is moved upwardly to the dotted position. At this time the holding bars 44 are also moved upwardly to the dotted line position shown in FIG. 1. This connection of the linkage to the deck gives the hoisting mechanism greater leverage for pushing up at the point indicated at 34 to raise the deck with a heavy load thereon.

When it is desired to discharge a light load such as bales of hay from the platform, such an operation is illustrated in FIG. 2. At this time the pivot pin 36 is removed from the pipe 28 and the push rods 32 are free to act as a link in the linkage and to pivot with respect to the deck 12.

At this time the pin 48 is inserted in the apertures therefor so that the bars 44 are maintained in a motionless state. This allows the hoisting mechanism to push up at the pivot point of the push rods 32 to lift the deck 12 and requires less power and moves the deck farther to the rear into position shown in FIG. 2 in which the deck is moved beyond a substantially vertical position.

Referring to FIGS. 4 and 5, the result in vertical force for heavy loads is indicated by the direction of the arrow shown vertically, while the diagonal arrow indicates the cylinder force, when the mechanism is used for lifting heavy loads, as is shown in FIG. 1. FIG. 5 is similar to FIG. 4 except that it illustrates the force transmitted through the push rods by the horizontal arrow therein and the smaller result in vertical force for the lighter load such as hay closer to the deck pivot point and the diagonal arrow indicates the cylinder force.

Thus, from the foregoing description, it is apparent that the present invention provides a novel folding linkage and a truck hoist in which the linkage can be selectively connected so as to be pivotally connected to the different locations of the truck so as to utilize the same mechanism for lifting a heavy load or a light load, in which the selection connection of the apparatus to pivot about a different location, also permits the tilt of the deck of the truck bed to vary.

Inasmuch as various changes may be made in the relative form, location and arrangement of the parts without departing from the invention, it is not meant to limit the scope of the invention, except by the appended claims.

What is claimed is:

1. A vehicle with a load holding deck and a chassis supporting said deck, means pivotally connecting said deck to said chassis to permit raising said deck to discharge material therefrom, and hoisting means operatively connected to said deck to raise it, including truss link means, push rod means pivotally connected at one end to one end of said truss link means and at the other end to said deck, holding bar means pivotally connected at one end to the other end of said truss link means and at the other end to said chassis, ram means pivotally connected to said chassis and to said truss link means for moving said truss link means and said deck to a discharge position, and first means to secure said push rod means with respect to said deck whereby to selectively permit said push rod means to pivot at each end or only with respect to said truss link means, and second means operative between said holding bar means and said chassis to selectively fix said holding bar means with respect to said chassis or to permit said holding bar means to pivot about said connection with the chassis whereby said hoisting mechanism may be selectively operated for use with light or heavy loads.

2. The vehicle of claim 1, wherein said truss link means is a link and has the front end connected to the front end of said push rod means and the rear end of said push rod means is connected to said deck.

3. The vehicle of claim 2, wherein the rear end of said truss link means is connected to the rear end of said holding bar means.

4. The vehicle of claim 3, wherein said ram means has its front end connected to the front end of said holding bar means.

5. The vehicle of claim 4, wherein said front end of said ram means and front end of said holding bar means are pivotally connected to said chassis on the same transverse pivot point.

6. The vehicle of claim 5, wherein said first means is a pivot means connected to the front ends of said truss link means and push rod means.

7. The vehicle of claim 6, wherein said second means is a pivot means connected to the rear ends of the truss link means and holding bar means.

References Cited

UNITED STATES PATENTS

| | | | |
|---|---|---|---|
| 1,552,281 | 9/1925 | Edwards | 298—22(RC) |
| 1,904,922 | 4/1933 | Jungersen | 298—22(RC) |
| 2,332,961 | 10/1943 | Wood | 298—22(J) |
| 2,620,225 | 12/1952 | Hutchinson | 298—22(R) |

FOREIGN PATENTS

| | | | |
|---|---|---|---|
| 722,518 | 11/1965 | Canada | 298—22(J) |

RICHARD J. JOHNSON, Primary Examiner